Figure 1:
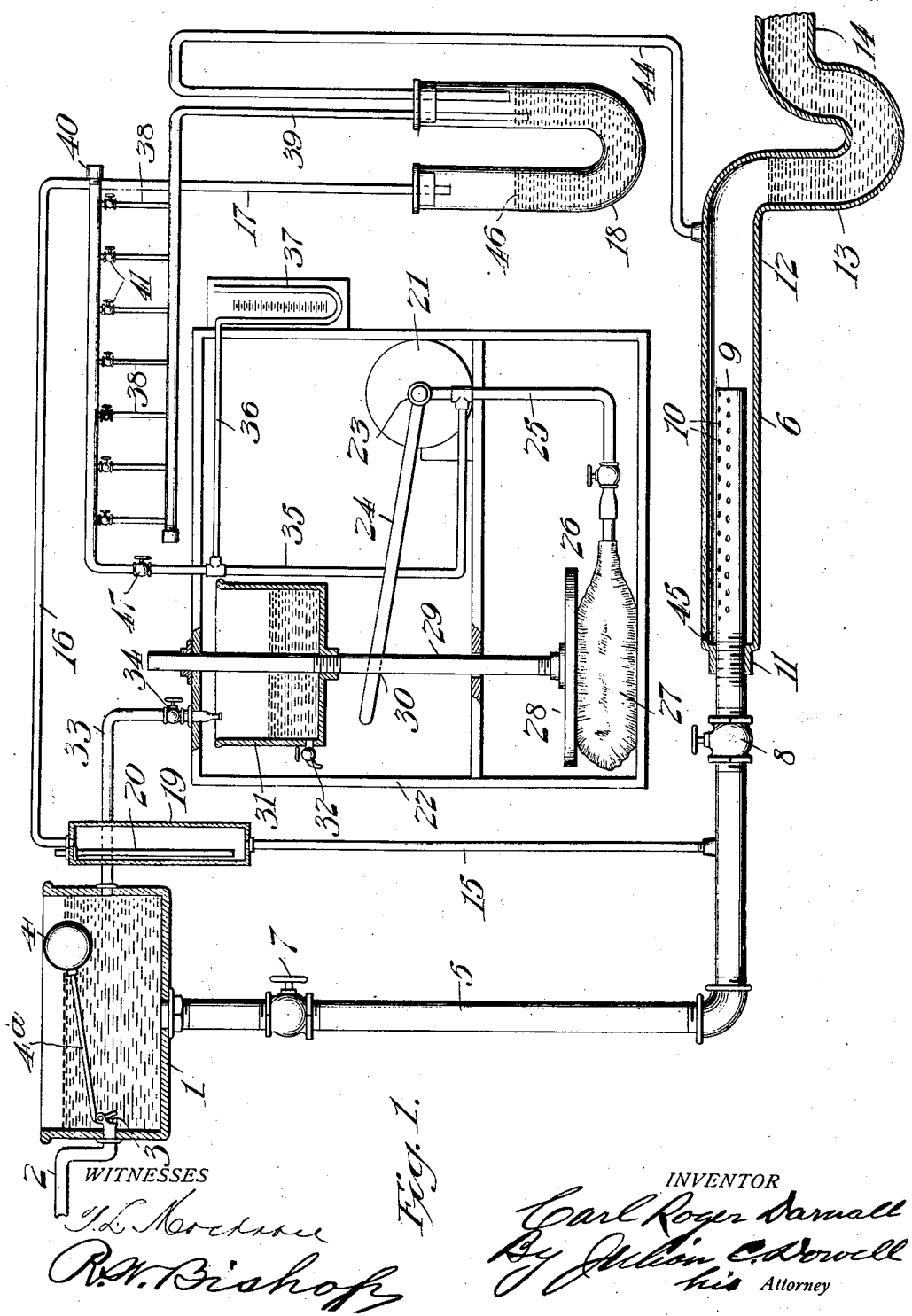

C. R. DARNALL.
WATER AND SEWAGE PURIFICATION.
APPLICATION FILED JAN. 23, 1911.

1,007,542.

Patented Oct. 31, 1911.

WITNESSES

INVENTOR
Carl Roger Darnall
By Julien C. Dowell
his Attorney

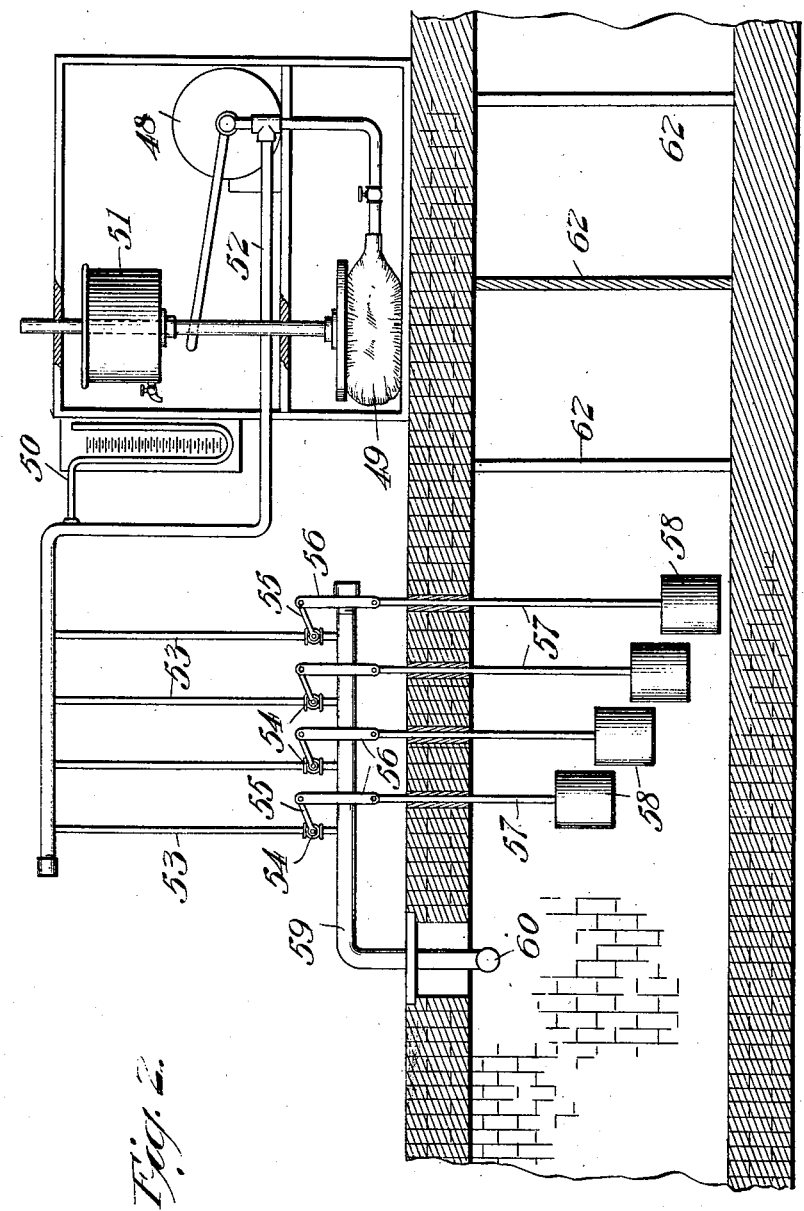

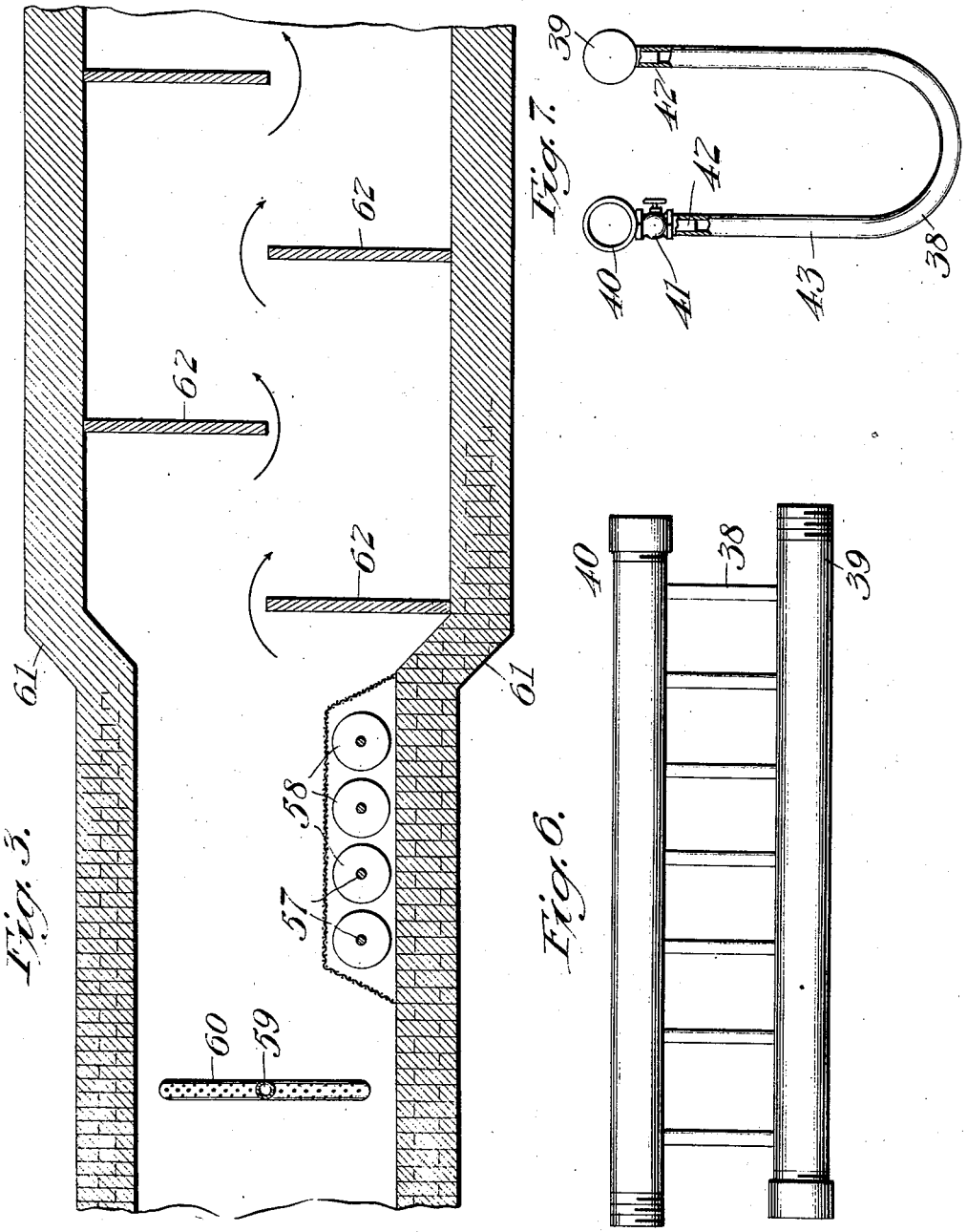

C. R. DARNALL.
WATER AND SEWAGE PURIFICATION.
APPLICATION FILED JAN. 23, 1911.
1,007,542.
Patented Oct. 31, 1911.
4 SHEETS—SHEET 4.
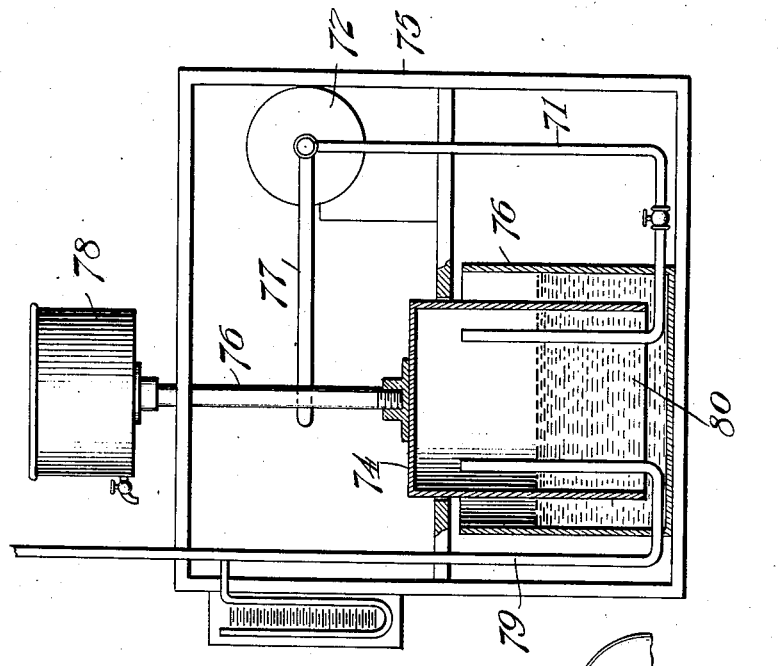
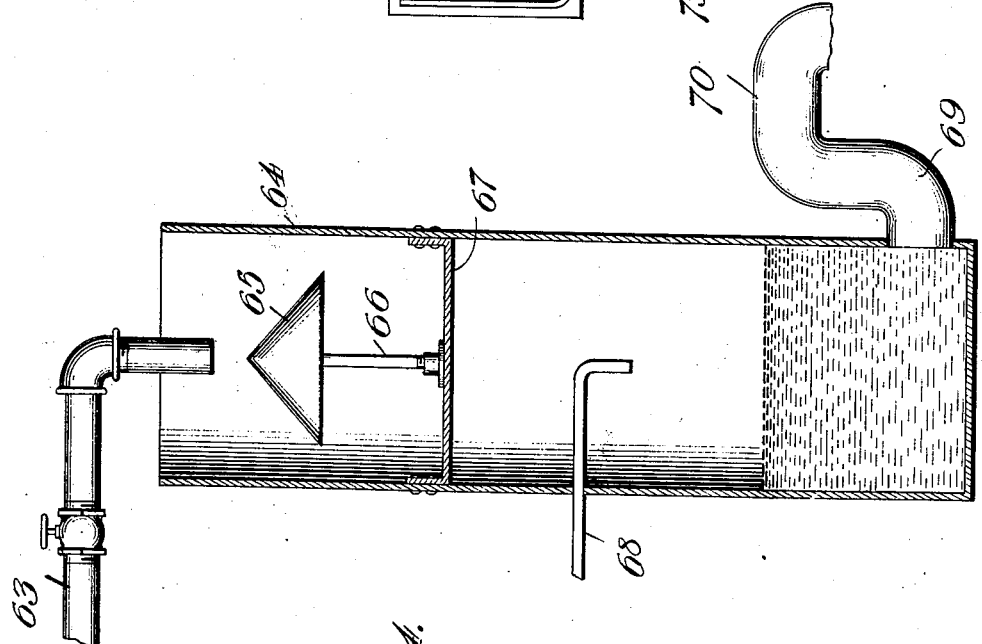
WITNESSES
INVENTOR
Carl Roger Darnall
By Julian C. Dowell
His Attorney

UNITED STATES PATENT OFFICE.

CARL ROGER DARNALL, OF WASHINGTON, DISTRICT OF COLUMBIA.

WATER AND SEWAGE PURIFICATION.

1,007,542.            Specification of Letters Patent.      Patented Oct. 31, 1911.

Application filed January 23, 1911. Serial No. 604,219.

*To all whom it may concern:*

Be it known that I, CARL ROGER DARNALL, a citizen of the United States, residing at Washington, in the District of Columbia, have invented certain new and useful Improvements in Water and Sewage Purification, of which the following is a specification.

The object of this invention is to make practical the use of chlorin gas in the treatment of sewage and the purification of water or other fluids.

It has heretofore been proposed to use chlorin gas in the treatment of sewage, but not in a dry state and the results have been unsatisfactory for the reason that no reliable method of regulating the amount of chlorin used has been available, and the chlorin has been either generated in the apparatus itself by means of chemicals or electricity, or was added as chlorin water of uncertain strength. Other methods of treatment have used hypochlorites as a means to introduce chlorin into the sewage, and this was objectionable as the dosage was inaccurate, owing to the fact that the chlorin content is variable and unknown, from day to day, unless frequent assays are made. A decided objection to the use of hypochlorites for the purification of water resides in the disagreeable taste and unpleasant odor imparted to the water when these agents are employed in sufficient quantity to properly purify it, so that the water becomes unfit for domestic use.

By my invention, I make it possible to use dry or anhydrous, practically chemically pure chlorin, which is now placed upon the market in a liquefied state in steel cylinders or drums. So far as I am aware, the use of dry chlorin for treating water has not been attempted, and is a distinct advance in the art of water and sewage purification. I have demonstrated that such dry chlorin may be accurately supplied to the water in a predetermined quantity, and this quantity may be increased or decreased at will. I have also demonstrated that such dry purified chlorin can be used in greater quantities than is necessary to effectually sterilize or purify the water without imparting taste or odor to the same, and without impairing its wholesomeness for drinking or other domestic purposes. Approximately three parts of dry chlorin to a million parts of water (one-fifth of a grain per gallon) may be added to ordinary river water before the odor or taste of chlorin is perceptible, whereas more than .75 of one part per million (one-twentieth of a grain per gallon) will rarely be required to sterilize the water. I have found that as a rule, about one-half of one part per million or about one-thirtieth of a grain per gallon will suffice. If more chlorin than is actually necessary is used, the residue is rapidly converted into hypochlorous acid, and finally into hydrochloric acid by combining with some of the hydrogen in the water. The hydrochloric acid thus formed is neutralized by the carbonate of lime present in all river and well water. In the purification of sewage, larger quantities of chlorin will be required, the quantity depending upon the character and concentration of the sewage and the degree to which the purification is to be carried.

The objects of my invention are attained in an apparatus such as illustrated in the drawings, and the invention resides in certain novel features of construction, arrangement and operation which will be hereinafter first fully described, and then more particularly pointed out in the appended claims.

In the drawings, which illustrate typical embodiments of the invention, Figure 1 is a view partly in section, and partly in elevation, showing my invention adapted for the purification of water, the figure being more or less diagrammatic in its nature; Fig. 2 is a similar view showing the invention applied to the purification of sewage or use in a large aqueduct and illustrating slight modifications of some of the parts; Fig. 3 is a horizontal section of the sewer or aqueduct shown in Fig. 2; Fig. 4 is a vertical sectional view showing a modification of the mixing chamber; Fig. 5 is a view showing a modified form of pressure regulator; Figs. 6 and 7 are detail views of the means for regulating the quantity of chlorin fed to the mixing chamber.

Referring more particularly to the drawings, 1 designates a tank or reservoir from which the water or sewage to be treated is permitted to pass to the mixing chamber under a constant head or pressure. In the illustrated arrangement the water or other matter is supplied to this reservoir through a main or pipe 2, the end of which is covered or uncovered by a valve 3, which is operated automatically by a float 4 connected with the valve through a lever 4ª so that the level of the liquid in the reservoir will be maintained constantly at about the point indicated by the dotted line. From the reservoir 1 a pipe 5 leads to the mixing chamber 6, and in this pipe 5 are provided two valves 7 and 8 by which the flow of the liquid may be regulated and controlled. The end of the pipe 5 is closed, as indicated at 9, and in its upper side near its extremity I provide a plurality of small openings or perforations 10 by which the water passing into the pipe is caused to escape therefrom in a series of fine jets or a spray, as will be readily understood. The valve 7 is adjusted to admit to the pipe less water than the valve 8 will permit to escape, so that when the apparatus is working all the water that passes the valve 7 will be discharged through the perforations 10, and the entire body of water will be treated by the chlorin gas. Surrounding the end of the pipe 5 and connected thereto by an air-tight joint, as shown at 11, is an outer tube pipe or casing 12, which is provided with a water seal 13 leading into a discharge pipe 14, by which the purified water is carried off to the place of deposit or point of use. Between the valves 7 and 8 a branch pipe 15 rises and communicates through branches 16 and 17 with a cut-off and indicator 18, as will be presently described. This pipe 15 is also formed with an enlargement 19, in the upper end of which is fitted a vent or air tube 20 having an air-tight connection with the upper end of the enlargement or chamber 19 and having its upper end open to the atmosphere, while its lower end is disposed near the bottom of the enlargement or chamber as shown.

The chlorin gas is supplied, as before stated, in a cylinder or drum, and one of these cylinders or drums is indicated at 21. The said drum or cylinder is supported in any convenient manner upon a suitable frame or support 22, and is provided at one end with an outlet valve 23 from the stem of which a lever 24 extends, as shown. A gas pipe 25 leads from the valve 23 to a pressure regulator 26 consisting, in the form shown in Fig. 1, of an expansible bag or receptacle 27 supported upon the frame 22 in any convenient position, as will be readily understood. Resting upon the bag 27 is a presser plate 28 from which a guide rod or standard 29 rises through the frame 22, so as to be guided thereby, and this guide rod or standard 29 is slotted to receive the end of the lever 24, as indicated at 30, so that the movements of the said rod or standard will be transmitted directly to the said lever 24 and the valve 23 consequently opened or closed more or less as more or less chlorin is necessary in the operation of the invention. It will be readily understood, of course, that the pressure under which the gas will operate may be regulated by increasing the weight placed upon the bag 27 through the plate 28 and rod 29, and a convenient means of varying this weight is illustrated. A cup 31 is secured to the rod or standard 29 and a small stop cock or drip 32 is fitted in the lower end of the said cup. A small branch pipe 33 leads from the reservoir 1 to a point over the cup and is provided at its extremity with a valve 34. If the valve 34 be opened and the stop cock 32 closed, water will, of course, collect in the cup and the pressure exerted by the rod 29 and the plate 28 upon the bag 27 may therefore be regulated to a nicety. The gas passes toward the mixing chamber from the pipe 25 through a branch 35. A short branch 36 leads from the branch 35 to a manometer or other form of pressure gage 37, by which the pressure of the gas passing to the mixing chamber may be accurately indicated, and, consequently, the desired pressure readily obtained through the manipulation of the valve 34, as before described. The pipe 35 preferably leads indirectly to the indicator and cut-off 18 through resistance tubes or branches 38 and a discharge pipe 39 common to all said tubes. The adjacent or overlapping ends of the pipe members 35 and 39 are closed, as indicated at 40, and a valve 41 is provided near the pipe 35 in each resistance tube or branch 38 whereby the gas may be admitted to or cut off from each tube independently of all the others. The tubes 38 are approximately U-shaped, as indicated in Fig. 7, and lead into the member 39 of the gas pipe, by which the gas is carried into the indicator and cut-off 18, the extremity of said member being normally slightly below the level of the fluid in said cut-off and indicator. The ends of the U-shaped branches or resistance tubes 38 are closed by porous plugs of coke or other material which will not corrode under the action of the chlorin, as shown at 42, and between the plugs I provide a filling of clay, charcoal, or other material which will retard the flow of the gas and maintain the dry condition of the same, as indicated at 43. Owing to the corrosive action of chlorin and the relatively minute quantity required for the purification of water and sewage, it is almost impossible (except in very large plants) to supply it with certainty and accuracy through one or even a few orifices, inasmuch as the openings required are necessarily small, almost microscopic, and therefore are easily stopped or obstructed by particles of dust, rust from the pipes, etc. The resistance tubes herein disclosed filled with charcoal, coke, clay, fine sand or similar material will retard the flow of the gas to such an extent that it will pass to the water in the required microscopic quantities and also permit the cut-off valves to be opened fully, so that the collection of small particles of dust or deposits caused by corrosion will not take place around the valves to interfere with the easy operation of the same. Were it attempted to regulate the flow of gas by only partly opening the cut-off valve, the passage through the valve might be obstructed by a small particle of dust or other matter so that no gas at all would pass. In my apparatus, however, the valve may be opened to its fullest extent, so that the gas will pass freely therethrough, but the gas will be held in the resistance tube by the material therein, so that it will not flow to the mixing chamber in such quantity and at such speed as to be objectionable. It will be understood, of course, that one or more cut-off valves will be opened, as may be required by the circumstances of any particular case, and each valve will be either fully opened or fully closed, the desired retardation of the gas being effected by the resistance tubes.

The gas is carried from the cut-off 18 by a member 44 of the gas pipe, which leads into the outer tube 12 of the mixing chamber 6, and has an air-tight connection with the said tube. The gas discharged into the tube 12 will be prevented from escaping therefrom into the discharge pipe 14 by the water seal 13, and will, consequently, be forced to flow toward the pipe 5 and pass through the water escaping therefrom through the perforations 10. The gas will consequently be absorbed by the water, and the water purified, as already stated. Any gas which may escape from the water will pass from the tube 12 through a vent 45 at the front end of the tube and open to the atmosphere.

The indicator and cut-off 18 consists of a U-shaped glass tube having placed therein a quantity of water, sulfuric acid or other fluid which will form a seal around the base of the tube and will have a normally constant level, as indicated by the dotted line at 46, the pipes 39 and 44 entering the tube through one end of the same and having their extremities respectively below and above the normal level of the fluid, as clearly indicated. Into the opposite end of the tube, the water pipe 17 enters and terminates above the level of the fluid, as shown.

It is thought the operation of the apparatus thus far described will be readily appreciated. The several valves being adjusted to the requirements of the particular plant, the valve 8 is opened fully, so that the water will escape through the perforations 10 and gas is permitted to flow through the pipe 25 to the gas bag 27. The gas will, of course, pass through the pipes 35 and 36, and, one or more of the valves 41 being opened, the desired quantity of the gas will be permitted to pass to the mixing chamber, as will be understood. As the pressure of the gas in the bag 27 is raised, the lever 24 will be swung upward to close the valve 23 and consequently cut off the supply of gas until the pressure of the same falls below the desired normal pressure, whereupon the said plate and lever will drop and the valve 23 will open to admit an additional quantity of gas to the several gas pipes and the bag 27. It will thus be seen that while the gas in the cylinder or drum 21 is under a very high pressure, the gas admitted to the mixing chamber will be under a uniform low pressure, so that it will be discharged into the mixing chamber with only such velocity and in such quantity as may be necessary for the thorough purification of the water or other liquid. When the operation of the apparatus is to be arrested, it is necessary merely to close the valve 8, whereupon the flow of water through the perforations 10 will cease, and the water, continuing to flow through the valve 7, will rise through the pipe 15 and seal the lower end of the vent 20, so that as the water continues to rise through the pipe 15 and the chamber 19, the air above the water will be compressed through the pipes 16 and 17, within the tube 18, and force the liquid in said tube upward about and over the end and into the bore of the pipe 44, so that the flow of the gas will be stopped. Loss of gas will thus be prevented, and, if so desired, a valve 47 may be provided in the pipe 35 in advance of the first resistance tube, which may then be manually closed to prevent the passage of additional gas into the tubes 38 and the pipe 39. This valve 47, however, is not essential and may be omitted without affecting the practical utility of the invention. When it is desired to again operate the apparatus, the valves 47 and 8 are fully opened, so that the water will again flow through the perforations 10. As the valve 8 has a greater capacity than the valve 7, the water in the pipe 15 will pass out through the perforations 10 and consequently the chamber 19 and the pipe 15 will be drained, so that the air pressure upon the liquid in the tube 18 will be reduced, the air escaping through the vent 20, and the said liquid will return to its normal level, uncovering the end of the pipe 44 and permitting the chlorin gas to again flow to the mixing chamber.

It will be readily seen, from the foregoing description, that I have provided means whereby the operation of treating water or other liquid with dry chlorin gas will be accomplished automatically, and the only manipulation required from the attendant is the opening or closing of the valve by which the flow of water into the mixing chamber is established or cut off. The quantity of gas passing to the mixing chamber will be adjusted to the needs of a particular plant and only so much gas as is necessary for the particular plant will be used. The several resistance tubes 38 serve to retard the flow of gas so as to prevent an excess of gas in the mixing chamber, while by providing a plurality of these branches or resistance tubes, a sufficient quantity of gas may be admitted to answer the requirements of any particular case.

All the parts of the apparatus are constructed of material which will be non-corrosive, so that the use of the gas will be unhampered by any obstruction or choking of any portion of the apparatus. The tube 18 is preferably of glass, so that the passage of the gas through the same and the level of the liquid therein may be seen at all times and the attendant will know positively whether gas is passing to the mixing chamber. When all of the gas has been used, a new drum or cylinder may be placed in position in the frame 22 without delay and without prolonged inaction of the apparatus. When a fresh drum or cylinder is to be brought into use, the lever 24 and the pressure plate are propped in the position assumed by them when the valve 23 is fully closed by any convenient means. After the drum is in place and the valve 23 is coupled to the lever 24, the prop is removed and the lever and pressure plate at once drop by gravity to the fully open position, whereupon the flow of gas will begin. The trap 13 not only prevents the escape of the gas fed into the mixing chamber, but also serves to further commingle the gas and the water by preventing the direct escape of the water, and, consequently, causing the complete agitation of the same with the gas before its final discharge through the main or pipe 14.

In Figs. 2 and 3 I have shown the invention applied to a large aqueduct or sewer and have also shown a slightly different arrangement of the pressure regulator. The cylinder or drum 48, the bag 49 and the manometer 50 as well as the cup 51 are of the same construction as the corresponding elements shown in Fig. 1. The manometer, however, is arranged at the opposite side of the frame to that shown in Fig. 1, the gas pipe 52 extends to the outside of the frame horizontally before turning upward, and the resistance tubes 53 are arranged in a slightly different position relative to the frame. The valves 54 by which the flow of gas to the mixing chamber is controlled, are arranged in the resistance tubes 53, and are each provided with stems 55 connected, by links 56, with rods 57 rising from floats 58 arranged at one side of the sewer or aqueduct, at successively different levels, as shown. The several tubes 53 beyond the valves 54 communicate with a common discharge pipe 59, corresponding to the pipe 39 in the form illustrated in Fig. 1, and this pipe 59 passes into the sewer or aqueduct and terminates in a transverse perforated branch 60 arranged above the maximum level of the fluid flowing through the sewer or aqueduct.

It will be readily seen that in this apparatus the gas will pass through the pipe 52 and into the tubes 53 under a constant pressure, and that, as the level of the water or other liquid in the sewer or aqueduct rises and falls, the quantity of gas admitted thereto will be automatically controlled by the rising and falling of the several floats and the consequent opening and closing of the different valves 54. When the liquid is at a low level, only the lowest float will be actuated and consequently only one valve 54 will be opened. Should the level of the liquid rise, the second float will be actuated and consequently the second valve will be opened, so that double the quantity of gas will be admitted, the quantity of gas being thus automatically regulated and adjusted to the quantity of the water to be treated. Beyond the several floats 58 the sewer or aqueduct is laterally expanded, as shown at 61, and partitions or baffles 62 are extended alternately from the opposite sides of the sewer, so as to retard the flow of water and consequently cause a thorough commingling of the gas and water, as will be understood. The gas discharged above the surface of the water will commingle with the air in the conduit, above the water, and will be rapidly absorbed by the water or sewage flowing through the conduit, while a thorough commingling of the water and the gas will be effected by its tortuous passage around the baffles 62.

In Fig. 4 I have illustrated a slight modification in which the mixing chamber is disposed vertically instead of horizontally, as in Fig. 1. In this form of the device, the pipe 63 discharges the water within the vertical stand-pipe or casing 64 directly upon a conical deflector 65 arranged concentrically within the said casing 64 and having its edge spaced from the walls of the casing, as shown. This deflector is secured rigidly to the upper end of a standard or post 66 rising from a cross bar 67 secured to and extending across the casing 64, as shown. The chlorin gas is admitted to the casing 64 through the pipe 68 below the cross bar 67 and the commingled water and gas flows from the lower end of the casing through a water seal 69 into the discharging pipe or main 70, as will be readily understood. The seal 69 serves the same purpose as the seal 13 in the form shown in Fig. 1, and the chlorin gas is consequently prevented from escaping directly from the casing 64 and caused to commingle with the sheet of water falling through the casing, and inasmuch as the conical deflector 65 throws the water outward in all directions against the walls of the casing, a thin sheet of water is constantly passing across the space between the deflector and the casing, so that the escape of the gas from the upper end of the casing without being absorbed by the water is prevented. This form of mixing chamber may frequently be found desirable, owing to the contracted space in which the plant must be set up.

In Fig. 5, I have shown a different form of pressure regulator in which the flexible bag 27 is dispensed with, and the gas pipe 71 passing from the gas drum or cylinder 72 leads into a tank 73 and rises within the bell 74 in said tank to about the level of the upper end of the tank. The supporting frame 75 is arranged to fit closely around the bell 74 so as to guide the same without interfering with its free movement. The rod or standard 76, rising from the bell, engages the lever 77 which operates the discharge valve of the drum 72, and a cup 78 is provided on the rod 76 to permit the device to be adjusted to the desired working pressure of the gas in the same manner as the apparatus shown in Fig. 1. The gas is conveyed to the working parts of the apparatus from the bell 74 by a pipe 79 having its extremity open within the bell, as shown, and above the level of the sealing liquid 80 placed in the tank 73 around the bell, as will be readily understood. The operation of this device is essentially the same as the regulator shown in Fig. 1, the bell rising and falling as the pressure of the gas varies, and consequently manipulating the lever 77 so as to close and open the discharge valve to control the flow of gas from the drum 72. This form of regulator, however, is not as desirable as the gas bag for the reason that, owing to the presence of the liquid therein, the gas absorbs moisture before its admission to the mixing chamber and causes corrosion of the pipes.

Having thus described my invention what I claim is:

1. Means for treating liquids with chlorin gas comprising a mixing chamber, means for admitting water and gas to said chamber, and means whereby cutting off the water will create back pressure on the gas to arrest the flow thereof.

2. An apparatus for purifying liquids comprising a mixing chamber, means for admitting water and a purifying agent to said chamber, means for adjusting the quantity of the purifying agent to the quantity of water to be treated, means for maintaining a uniform pressure upon the purifying agent, and means for automatically admitting and cutting off the purifying agent from the mixing chamber by admitting or cutting off the water.

3. The combination of a mixing chamber, means for admitting water thereto, a gas supply, a gas pipe leading from the gas supply, means for maintaining a constant pressure in the gas pipe, a plurality of retarding tubes leading from the said gas pipe, valves to admit the gas to one or more of said retarding tubes, a pipe common to all said tubes leading to the mixing chamber, and means controlled by the flow of water for automatically controlling the flow of the gas through the said pipe.

4. The combination of a mixing chamber, a water pipe leading thereinto, a gas supply, a gas pipe leading from the gas supply to the mixing chamber and formed in two members having their adjacent ends at different elevations, a body of liquid having its surface normally on a level between said ends, a pipe leading to said liquid from the water supply pipe, and means within said pipe whereby air will be compressed, when the flow of water is arrested, against the said body of liquid to force the same around and into the end of the higher member of the gas pipe and thereby arrest the flow of gas.

5. The combination of a mixing chamber, a water pipe leading thereinto, a U-shaped tube containing a body of liquid, a gas supply, a gas pipe leading from the said supply to the mixing chamber and having members terminating in one arm of the U-shaped tube respectively above and below the normal level of the liquid therein, a pipe leading from the water supply pipe into the other arm of the U-shaped tube above the normal level of the liquid therein, an air chamber in said pipe, a vent tube leading from said chamber having one end open to the atmosphere and the other end terminating near the bottom of said chamber, and a valve controlling the flow through the water supply pipe beyond the pipe leading to the U-shaped tube.

6. An apparatus for purifying liquids comprising a mixing chamber, means for supplying water to said chamber, and means for supplying dry chlorin gas to said mixing chamber, including a resistance tube inserted in said gas supplying means and containing material for retarding the flow of gas, substantially as described.

7. An apparatus for purifying water or sewage by the use of dry chlorin gas, which consists of a source of supply of gas under high pressure, a mixing chamber in communication with said source of supply, means for supplying water to said chamber, and means for establishing a flow of gas from said source of supply to said chamber under a uniform low pressure and admitting it to the water under such low pressure.

8. An apparatus for purifying water, which consists of a source of supply of dry chlorin gas under high pressure, means for effecting the admixture of the gas with the water, a gas receiver, means for conducting the gas from said source of supply into said receiver and from said receiver to said mixing means, means for establishing and maintaining a uniform low pressure of the gas in said receiver, and means for conducting the gas from said receiver and distributing it in the water under low pressure.

In testimony whereof I affix my signature, in presence of two witnesses.

CARL ROGER DARNALL.

Witnesses:
R. W. BISHOP,
CHAS. E. RIORDON.